(12) United States Patent
Jotoku et al.

(10) Patent No.: US 10,378,091 B2
(45) Date of Patent: Aug. 13, 2019

(54) WELDED JOINT

(71) Applicant: NIPPON STEEL & SUMITOMO METAL CORPORATION, Tokyo (JP)

(72) Inventors: Kana Jotoku, Amagasaki (JP); Hiroyuki Hirata, Neyagawa (JP); Yoshitaka Nishiyama, Nishinomiya (JP); Hirokazu Okada, Kobe (JP); Shinnosuke Kurihara, Amagasaki (JP); Yuhei Suzuki, Amagasaki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 336 days.

(21) Appl. No.: 15/117,462

(22) PCT Filed: Feb. 23, 2015

(86) PCT No.: PCT/JP2015/055061
§ 371 (c)(1),
(2) Date: Aug. 9, 2016

(87) PCT Pub. No.: WO2015/129631
PCT Pub. Date: Sep. 3, 2015

(65) Prior Publication Data
US 2016/0355911 A1  Dec. 8, 2016

(30) Foreign Application Priority Data
Feb. 26, 2014  (JP) ................. 2014-035385

(51) Int. Cl.
*C22C 38/58* (2006.01)
*B23K 35/30* (2006.01)
(Continued)

(52) U.S. Cl.
CPC .......... *C22C 38/58* (2013.01); *B23K 35/0255* (2013.01); *B23K 35/0261* (2013.01);
(Continued)

(58) Field of Classification Search
CPC ............ B23K 2103/04; B23K 35/0255; B23K 35/0272; C22C 19/055
(Continued)

(56) References Cited

U.S. PATENT DOCUMENTS 4,224,360 A * 9/1980 Ohnishi ................... B23K 9/04
219/76.12

FOREIGN PATENT DOCUMENTS

JP    07-214374    8/1995
JP    2001-107196    4/2001
(Continued)

OTHER PUBLICATIONS

NPL: English on-line translation of JP 2007186728 A, Jul. 2007 (Year: 2007).*
(Continued)

*Primary Examiner* — Jie Yang
(74) *Attorney, Agent, or Firm* — Clark & Brody

(57) ABSTRACT

A welded joint is obtained by using a welding material having a composition: Cr: 15.0 to 30.0%; and Ni: 40.0 to 70.0%, including: a base material having a composition: C: 0.03 to 0.075%; Si: 0.6 to 2.0%; Mn: 0.05 to 2.5%; P: up to 0.04%; S: up to 0.015%; Cr: more than 16.0% and less than 23.0%; Ni: not less than 20.0% and less than 30.0%; Cu: 0.5 to 10.0%; Mo: less than 1%; Al: up to 0.15%; N: 0.005 to 0.20%; O: up to 0.02%; Ca: 0 to 0.1%; REM: 0 to 0.15%; V: not less than 0% and less than 0.5%; and Nb: 0 to 2%, a balance being Fe and impurities and a first-layer weld metal including Fe content from 10 to 40%, all % by mass.

11 Claims, 1 Drawing Sheet

(51) Int. Cl.
    *B23K 35/02*     (2006.01)
    *C22C 30/02*     (2006.01)
    *C22C 19/05*     (2006.01)
    *C22C 38/00*     (2006.01)
    *C22C 38/02*     (2006.01)
    *C22C 38/04*     (2006.01)
    *C22C 38/06*     (2006.01)
    *C22C 38/42*     (2006.01)
    *C22C 38/44*     (2006.01)
    *C22C 38/46*     (2006.01)
    *C22C 38/48*     (2006.01)
    *B23K 103/04*     (2006.01)

(52) U.S. Cl.
CPC .......... *B23K 35/0272* (2013.01); *B23K 35/30* (2013.01); *B23K 35/304* (2013.01); *B23K 35/3053* (2013.01); *B23K 35/3066* (2013.01); *C22C 19/055* (2013.01); *C22C 19/056* (2013.01); *C22C 19/058* (2013.01); *C22C 30/02* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *B23K 2103/04* (2018.08)

(58) Field of Classification Search
USPC .............................................................. 420/8
See application file for complete search history.

(56) References Cited

FOREIGN PATENT DOCUMENTS

| | | |
|---|---|---|
| JP | 2002-235136 | 8/2002 |
| JP | 2004-148347 | 5/2004 |
| JP | 2006-045597 | 2/2006 |
| JP | 2007-186727 | 7/2007 |
| JP | 2007-186728 | 7/2007 |
| JP | 2012-000647 | 1/2012 |
| WO | 2009/107585 | 9/2009 |
| WO | 2012/176586 | 12/2012 |

OTHER PUBLICATIONS

NPL: English on-line translation of JP 2004148347 A, May 2004 (Year: 2004).*

NPL: English on-line translation of JP 2001107196 A, Apr. 2007 (Year: 2001).*

* cited by examiner

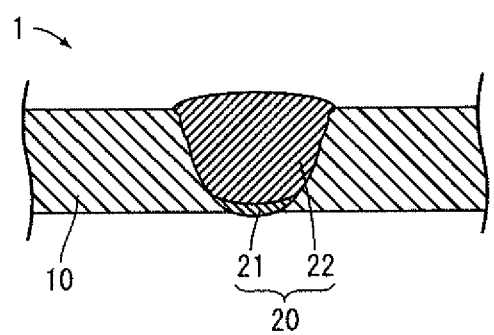

WELDED JOINT

TECHNICAL FIELD

The present invention relates to a welded joint, and more particularly to a welded joint having good metal-dusting resistance.

BACKGROUND ART

Demands for clean energy fuels such as hydrogen, methanol, liquid fuels (or gas-to-liquids (GTL)), or dimethyl ether (DME) are expected to grow significantly. Reforming equipment that are indispensable for manufacturing such synthetic gases are preferably large-sized ones with high thermal efficiency that are suitable for mass production. Further, reforming equipment for conventional petroleum refining or in petrochemical plants, for example, or ammonium production equipment or hydrogen production equipment using petroleum as a raw material, for example, are increasingly using heat exchange for waste heat collection to increase energy efficiency.

To effectively utilize such heat in high-temperature gases, heat exchange in the temperature range of 400 to 800° C., which is lower than conventional targets, is becoming important. Corrosion accompanying carburization of high-Cr-high-Ni—Fe alloy-based metal materials used in reaction tubes or heat exchangers in this temperature range is drawing attention as a problem.

Synthetic gases produced by such reaction equipment, that is, gases containing $H_2$, CO, $CO_2$, $H_2O$ and a hydrocarbon such as methane are usually in contact with the metal material of the reaction tube or the like at a temperature of 1000° C. or higher. In this temperature range, elements such as Cr or Si which have stronger tendencies to oxidize than Fe or Ni, for example, are selectively oxidized on the surface of the metal material such that a fine film of chromium oxide, silicon oxide or the like is formed, thereby preventing corrosion. However, in members at relatively low temperatures, such as heat-exchanging members, the diffusion of elements from the interior of the metal material toward the surface is insufficient such that the formation of oxidized films with corrosion-preventing effect is delayed. Further, since gases with a composition including hydrocarbon become carburizing, carbon enters the metal material through its surface, causing carburization.

When carburization progresses in an ethylene decomposition furnace tube, for example, and a carburization phase made of carbides of Cr or Fe, for example, is formed, this portion expands in volume. As a result, fine cracks can easily develop and, in the worst case scenario, the tube breaks while being used. Further, when a metal surface is exposed, carbon deposition (or caulking) occurs at the surface, with metal working as a catalyst, decreasing the flow passage area in the tube or decreasing heat transfer properties.

Also, heating furnace tubes in a catalytic cracking furnace which increase the octane number of naphtha produced by distillation of petroleum can be a severely carburizing environment made of hydrocarbon and hydrogen, causing carburization or metal dusting.

If such cracking, wear or clogging of the tube spread, this may cause a defect or the like in the equipment and interrupt its operation. In view of this, sufficient consideration is needed for selecting materials for equipment members.

To prevent corrosion caused by such carburization or metal dusting, various measures have been developed.

Traditionally, for such equipment members, high-Cr-high-Ni—Fe alloys have been used. For example, JP 2001-107196 A discloses a welded joint where a chemical composition is defined and the relationship between the Si, Cu or S content and the Nb, Ta, Ti and Zr contents and the relationship between the Ni, Co and Cu contents are limited to certain ranges. According to this document, this welded joint has good corrosion resistance and weld-crack resistance in a sulfuric-acid environment. However, this welded joint has a low Si content, making it difficult to use in an environment where metal dusting may occur.

JP 2002-235136 A discloses a welded joint made of an Ni-based heat-resistant alloy where it is proposed to actively include Al and a relationship between the amount of grain-boundary melting and the fixing force at grain boundaries is defined. According to this document, this welded joint has good carburization resistance and high-temperature strength. However, in this welded joint, an increase in the Si content to ensure metal-dusting resistance may cause solidification cracks to develop during welding, making it difficult to provide both metal-dusting resistance and solidification-cracking resistance during welding.

WO 2009/107585 proposes a metal material with increased C in a steel containing Si and Cu to reduce crack sensitivity in a heat-affected zone (hereinafter referred to as HAZ) during welding. However, a high C content increases solidification crack sensitivity during welding and also decreases creep ductility.

JP 2007-186727 A and JP 2007-186728 A propose including one or more of P, S, Sb and Bi in appropriate amounts to reduce gas dissociative absorption (i.e. gas/metal surface reaction). These elements segregate on a metal surface, which makes it possible to reduce carburization and corrosion due to metal dusting significantly even when they are not added in excessive amounts. However, these elements segregate not only on a metal surface but also along the boundaries of metal crystal grains, which leaves problems in hot workability and weldability.

WO 2012/524983 A proposes a metal material where the C content in a steel containing Si and Cu is limited to reduce solidification crack sensitivity and the Ti and Al contents are limited to reduce HAZ crack sensitivity. However, this document does not disclose welding materials required to weld metal materials to construct a structure.

JP 2006-45597 A proposes a welding material and a welded joint using it where an appropriate amount of Ti is added to reduce the adverse effects of Si.

DISCLOSURE OF THE INVENTION

Research by the present inventors showed that, even if certain metal-dusting resistances of a base material and a welding material are provided, when a welded joint is fabricated, a certain metal-dusting resistance may not be provided in the weld metal under some welding conditions.

An object of the present invention is to provide a welded joint having good metal-dusting resistance.

A welded joint according to the present invention is a welded joint obtained by welding using a welding material having a chemical composition including, in mass %, Cr: 15.0 to 35.0%; and Ni: 40.0 to 70.0%, including: a base material having a chemical composition of, in mass %: C: 0.03 to 0.075%; Si: 0.6 to 2.0%; Mn: 0.05 to 2.5%; P: up to 0.04%; S: up to 0.015%; Cr: more than 16.0% and less than 23.0%; Ni: not less than 20.0% and less than 30.0%; Cu: 0.5 to 10.0%; Mo: less than 1%; Al: up to 0.15%; N: 0.005 to 0.20%; O: up to 0.02%; Ca: 0 to 0.1%; REM: 0 to 0.15%;

V: not less than 0% and less than 0.5%; and Nb: 0 to 2%, a balance being Fe and impurities; and a first-layer weld metal having a chemical composition including, in mass %, an Fe content ranging from 10 to 40%.

The present invention provides a welded joint having good metal-dusting resistance.

BRIEF DESCRIPTION OF THE DRAWINGS

FIG. 1 is a schematic cross-sectional view of a welded joint.

EMBODIMENTS FOR CARRYING OUT THE INVENTION

The present inventors attempted to find out how to improve the metal-dusting resistance of a welded joint.

The metal-dusting resistance of a material is improved if the material contains elements such as Si, Cu and P. However, these elements significantly increase the solidification crack sensitivity of the material during welding. Solidification cracks during welding are produced when, at a stage close to the end of the solidification process in the welding and in which a liquid phase in film form is present mainly along crystal grain boundaries, the strain applied by solidification contraction or thermal contraction exceeds the deformability of the weld metal. The solidification crack sensitivity during welding may be reduced by improving the deformability of the weld metal. However, this requires changes to components of the base material, which is in contradiction to the objective of ensuring metal-dusting resistance. In view of this, the present inventors attempted to find out how to ensure metal-dusting resistance and solidification-crack resistance during welding without changing components of the base material.

As discussed above, even when certain metal-dusting resistances of the base material and welding material are provided, when the welded joint is fabricated, a certain metal-dusting resistance of the weld metal may not be provided under some welding conditions. Although details of its mechanism are not clear, it was found out that, in a region where the Fe content and Ni content in the weld metal are ill-balanced, the solidified microstructure may facilitate metal dusting. The first layer of the weld metal can be easily affected by the dilution ratio with respect to the base material such that the Fe content and the Ni content can easily become ill-balanced. Thus, if the first layer is a surface in contact with gases, metal dusting can easily occur.

To provide a welded joint having a metal-dusting resistance substantially equal to that of the base material, the Fe content in the weld metal must be limited. More specifically, if adjustments are done such that the Fe content in the first layer of the weld metal is 40 mass % or lower, a welded joint having a metal-dusting resistance substantially equal to that of the base material can be provided. On the other hand, if the Fe content in the first layer of the weld metal is too low, metal dusting can easily occur. In view of this, adjustments must be done such that the Fe content in the first layer of the weld metal is 10 mass % or higher.

The welded joint of the present invention was made based on the above findings. A welded joint according to an embodiment of the present invention will be described in detail below. In the description below, "%" for the content of an element means mass percentage.

The welded joint according to the present embodiment is obtained by welding a base material with a welding material having a chemical composition including Cr: 15.0 to 35.0% and Ni: 40.0 to 70.0%. The welded joint may be, for example, steel pipes or steel plates with their adjacent ends/edges welded together. The welded joint includes a base material and a weld metal. The weld metal is formed by a part of the base material and the welding material melting together and solidifying. The first-layer weld metal has a chemical composition with an Fe content ranging from 10 to 40%.

[Chemical Composition of Base Material]

The base material has the chemical composition described below.

C: 0.03 to 0.075%

Carbon (C) bonds with Cr, for example, to form a carbide, thereby increasing the strength of the base material. On the other hand, if an excessive amount of C is contained, creep ductility at high temperatures decreases. In view of this, the C content in the base material should be in the range from 0.03 to 0.075%. The preferable lower limit of the C content in the base material is 0.035%, and the more preferable lower limit is 0.04%. The preferable upper limit of the C content in the base material is 0.07%.

Si: 0.6 to 2.0%

Silicon (Si) has a strong affinity for oxygen, and forms Si-based oxidized scales under a protective oxidized-scale layer of $Cr_2O_3$, for example, thereby blocking carburizing gases. On the other hand, if an excessive amount of Si is contained, hot workability and weldability significantly deteriorates. In view of this, the Si content in the base material should be in the range from 0.6 to 2.0%. The preferable lower limit of the Si content in the base material is 0.8%. The preferable upper limit of the Si content in the base material is 1.5%.

Mn: 0.05 to 2.5%

Manganese (Mn) deoxidizes steel. Mn also stabilizes the austenitic phase. Mn further improves the workability and weldability of the steel. On the other hand, if an excessive amount of Mn is contained, the protective oxidized-scale layer's ability to block carburizing gases is impaired. In view of this, the Mn content in the base material should be in the range from 0.05 to 2.5%. The preferable lower limit of the Mn content in the base material is 0.1%. The preferable upper limit of the Mn content in the base material is 2.0%.

P: Up to 0.04%

Phosphorus (P) is an impurity entering steel from a raw material or the like during smelting. P deteriorates the hot workability and weldability of the steel. In view of this, the P content in the base material should be up to 0.04%. It is preferable to reduce the P content in the base material to the lowest level possible. The preferable upper limit of the P content in the base material is 0.03%, and the more preferable upper limit is 0.025%.

S: Up to 0.015%

Sulfur (S) is an impurity entering steel from a raw material or the like during smelting. S deteriorates the hot workability and weldability of the steel. This effect is of particular relevance in a steel with a high Si content or Cu content. In view of this, the S content in the base material should be up to 0.015%. It is preferable to reduce the S content in the base material to the lowest level possible. The preferable upper limit of the S content in the base material is 0.005%, and the more preferable upper limit is 0.002%.

Cr: More than 16.0% and Less than 23.0%

Chromium (Cr) forms a protective oxidized-scale layer of $Cr_2O_3$, for example, and blocks carburizing gases. Thus, Cr gives carburization resistance, metal-dusting resistance and caulking resistance to steel. On the other hand, Cr bonds with C to form carbides, thereby decreasing creep ductility. Further, Cr decreases the creep strength of the austenitic phase. This effect is particularly significant in steels with high Si and Cu contents. In view of this, the Cr content in the base material should be more than 16.0% and less than 23.0%. The preferable lower limit of the Cr content in the base material is 18.0%. To define an upper limit, the Cr content in the base material is preferably less than 20.0%.

Ni: Not Less than 20.0% and Less than 30.0%

Nickel (Ni) stabilizes an austenitic phase. Ni also decreases the enter rate of C entering the steel. Ni further increases the high-temperature strength of the steel. On the other hand, if an excessive amount of Ni is to be contained, this requires increased costs. Further, if an excessive amount of Ni is contained, this may facilitate caulking or metal dusting. In view of this, the Ni content in the base material should be not less than 20.0% and less than 30.0%. The preferable lower limit of the Ni content in the base material is 22.0%. The preferable upper limit of the Ni content in the base material is 28.0%.

Cu: 0.5 to 10.0%

Copper (Cu) prevents surface reaction between a carburizing gas and a metal, thereby improving the metal-dusting resistance of the metal. Cu also stabilizes the austenitic phase. On the other hand, if an excessive amount of Cu is contained, the weldability of the steel deteriorates. In view of this, the Cu content in the base material should be in the range from 0.5 to 10.0%. The preferable lower limit of the Cu content in the base material is 1.5%. The preferable upper limit of the Cu content in the base material is 6.0%.

Mo: Less than 1%

Molybdenum (Mo) is an impurity. If Mo is contained in 1% or more, this causes production of an intermetallic compound such as σ phase, which deteriorates microstructure stability and hot workability. In view of this, the Mo content in the base material should be less than 1%. On the other hand, an excessive reduction in Mo requires increased costs. Thus, the preferable lower limit of the Mo content in the base material is 0.05%.

Al: Less than 0.15%

Aluminum (Al) deoxidizes steel. On the other hand, if an excessive amount of Al is contained, a large amount of nitride is formed, which decreases the toughness of the steel. In view of this, the Al content in the base material should be less than 0.15%. The lower the Al content, the better it is. However, an excessively low amount of Al results in insufficient deoxidization. Further, an excessively low amount of Al increases the index of cleanliness of the steel. Further, an excessively low amount of Al requires increased costs. Thus, the preferable lower limit of the Al content in the base material is 0.03%.

N: 0.005 to 0.20%

Nitrogen (N) increases the high-temperature strength of steel. N further increases the activity of C in the base material, thereby improving the metal-dusting resistance of the base material. On the other hand, if an excessive amount of N is contained, the hot workability of the steel deteriorates. In view of this, the N content in the base material should be in the range from 0.005 to 0.20%. The preferable lower limit of the N content in the base material is 0.010%. The preferable upper limit of the N content in the base material is 0.15%.

O: Up to 0.02%

Oxygen (O) is an impurity. If an excessive amount of O is contained, the hot workability during production of the base material deteriorates. Further, if an excessive amount of O is contained, the toughness and ductility of the weld metal decrease. In view of this, the O content in the base material should be up to 0.02%. The preferable upper limit of the O content in the base material is 0.01%.

The balance in the chemical composition of the base material is Fe and impurities. Impurity means an element originating from ore or scraps used as the raw material of steel or an element that has entered for various reasons during the manufacturing process.

In the chemical composition of the base material according to the present embodiment, some of Fe above may be replaced by one or two selected from at least one of the first and second groups described below.

First group: Ca: up to 0.1%; REM: up to 0.15%
Second group: V: less than 0.5%; Nb: up to 2%

First Group (Ca: Up to 0.1%; REM: Up to 0.15%)

Calcium (Ca) and rare-earth metals (REMs) are optional elements. That is, Ca and REMs need not be contained in the base material. Both Ca and REMs improve the hot workability of steel. Thus, one or two of Ca and REMs may be contained in the base material as necessary. If effects of Ca and REMs in the base material are desired, it is preferable that at least one of them is contained in 0.005% or more.

"REM" is a general term for 17 elements in total, i.e. Sc, Y and the lanthanoids, and the content of REMs is the total content of one or more REM elements. Further, REMs are typically contained in misch metal. Thus, for example, misch metal may be added such that the REM content is in the above-described range.

On the other hand, if an excessive amount of Ca is contained, the weldability of steel deteriorates. In view of this, the upper limit of the Ca content in the base material should be 0.15%. If an excessive amount of REMs is contained, the weldability of the steel deteriorates. In view of this, the upper limit of the REM content in the base material should be 0.15%. Only one of Ca and REMs may be contained, or two of them may be combined and contained. If two of them are combined and contained, the preferable upper limit of the total content is 0.2%.

Second Group (V Less than 0.5%; Nb: Up to 2%)

Vanadium (V) and Niobium (Nb) are optional elements. That is, V and Nb need not be contained in the base material. Both V and Nb improve the high-temperature strength of steel. Thus, one or both of V and Nb may be contained in the base material as necessary. If effects of V are desired, it is preferable that V is contained in 0.002% or more; if effects of Nb are desired, it is preferable that Nb is contained in 0.005% or more.

On the other hand, if an excessive amount of V is contained, the weldability of the steel deteriorates. In view of this, to define an upper limit, the V content in the base material should be less than 0.5%. If an excessive amount of Nb is contained, the weldability of the steel deteriorates. In view of this, the upper limit of the Nb content in the base material should be 2%. Only one of V and Nb may be contained, or the two may be combined and contained. If the two are combined and contained, the preferable upper limit of the total content is 2.2%.

[Chemical Composition of First Layer of Weld Metal]

The weld metal of the welded joint according to the present embodiment includes a first layer having a chemical composition with an Fe content ranging from 10 to 40%. Solidification segregation occurs in weld metal. Although details of its mechanism are not clear, in a region where the Fe content and Ni content in the weld metal are ill-balanced, the solidified microstructure may facilitate metal dusting. The first layer of the weld metal can be easily affected by the dilution ratio with respect to the base material such that the Fe content and the Ni content can easily become ill-balanced. A first layer with an Fe content ranging from 10 to 40% has a metal-dusting resistance substantially equal to that of the base material.

First layer of the weld metal (first-layer weld metal) means the first layer defined in JIS B 0190. More specifically, first-layer weld metal means the weld metal fabricated by the first pass of welding. The weld metal is formed by the base material and welding material melting together and solidifying. The greater the pass number, the less the weld metal is affected by the composition of the base material (i.e. diluted by the base material) such that the components of the welding material become dominant. In view of this, the component ranges of only the first-layer weld metal, which can be easily affected by the dilution by the base material, must be managed and its performance must be ensured.

FIG. 1 is a schematic cross-sectional view of a welded joint 1, which is one example welded joint. The welded joint 1 includes a base material 10 and a weld metal 20. In this example, the weld metal 20 includes a first-layer weld metal 21 and second and subsequent layers 22.

The first layer of the weld metal preferably has the chemical composition described below.

C: 0.01 to 0.15%

Carbon (C) increases the strength of the weld metal. On the other hand, if an excessive amount of C is contained, the toughness of the weld metal decreases. In view of this, the C content in the first layer of the weld metal should be in the range from 0.01 to 0.15%. The preferable lower limit of the C content in first layer of weld metal is 0.03%, and the more preferable lower limit is 0.05%. The preferable upper limit of the C content in the first layer of the weld metal is 0.12%, and the more preferable upper limit is 0.10%.

Si: 0.01 to 4.0%

Silicon (Si) has a strong affinity for oxygen, and forms Si-based oxidized scales under a protective oxidized-scale layer of $Cr_2O_3$, for example, thereby blocking carburizing gases. On the other hand, if an excessive amount of Si is contained, hot workability and weldability significantly deteriorate. In view of this, the Si content in the first layer of the weld metal should be in the range from 0.01 to 4.0%. The preferable lower limit of the Si content in the first layer of the weld metal is 0.08%, and the more preferable lower limit is 0.3%. The preferable upper limit of the Si content in the first layer of the weld metal is 3.5%, and the more preferable upper limit is 2.0%.

Mn: 0.05 to 3.0%

Manganese (Mn) deoxidizes steel. Mn also stabilizes the austenitic phase. Mn further improves the workability and weldability of the steel. On the other hand, if an excessive amount of Mn is contained, the protective oxidized-scale layer's ability to block carburizing gases is impaired. In view of this, the Mn content in the first layer of the weld metal should be in the range from 0.05 to 3.0%. The preferable lower limit of the Mn content in the first layer of the weld metal is 0.1%. The preferable upper limit of the Mn content in the first layer of the weld metal is 2.5%.

P: Up to 0.03%

Phosphorus (P) is an impurity entering steel from a raw material or the like during smelting. P deteriorates the hot workability and weldability of the steel. P further increases the solidification crack sensitivity during welding in the weld metal. In view of this, the P content in the first layer of the weld metal should be up to 0.03%. It is preferable to reduce the P content in the first layer of the weld metal to the lowest level possible. The preferable upper limit of the P content in the first layer of the weld metal is 0.025%.

S: Up to 0.015%

Sulfur (S) is an impurity entering steel from a raw material or the like during smelting. S deteriorates the hot workability and weldability of the steel. In view of this, the S content in the first layer of the weld metal should be up to 0.015%. It is preferable to reduce the S content in the first layer of the weld metal to the lowest level possible. The preferable upper limit of the S content in the first layer of the weld metal is 0.005%, and the more preferable upper limit is 0.002%.

Cr: More than 16.0% and Less than 32.0%

Chromium (Cr), in a high-temperature use environment, bonds with C that has entered the welded joint and thus delays the growth of carburized layers, thereby increasing metal-dusting resistance. On the other hand, if an excessive amount of Cr is contained, the toughness of the weld metal decreases. In view of this, the Cr content in the first layer of the weld metal should be more than 16.0% and less than 32.0%. The preferable lower limit of the Cr content in the first layer of the weld metal is 18.0%. To define an upper limit, the Cr content in the first layer of the weld metal is preferably less than 23.0%, and more preferably less than 20.0%.

Ni: Not Less than 20.0%

Nickel (Ni) increases high-temperature strength and microstructure stability. Ni further increases corrosion resistance when present together with Cr. Ni also prevents metal dusting. In view of this, the Ni content in the first layer of the weld metal should be not less than 20.0%. The preferable upper limit of the Ni content in the first layer of the weld metal is 80%.

Cu: 0.03 to 5.0%

Copper (Cu) prevents surface reaction between a carburizing gas and a metal, thereby improving the metal-dusting resistance of the metal. Cu also stabilizes the austenitic phase. On the other hand, if an excessive amount of Cu is contained, the solidification cracking sensitivity during welding increases. In view of this, the Cu content in the first layer of the weld metal should be in the range from 0.03 to 5.0%. The preferable lower limit of the Cu content in the first layer of the weld metal is 0.04%. The preferable upper limit of the Cu content in the first layer of the weld metal is 4.5%.

Al: Up to 1.0%

Aluminum (Al) deoxidizes steel. On the other hand, if an excessive amount of Al is contained, a large amount of nitride is formed, which decreases the toughness of the steel. Further, if an excessive amount of Al is contained, welding operability deteriorates. In view of this, the Al content in the first layer of the weld metal should be up to 1.0%. The lower the Al content, the better it is. However, an excessively low amount of Al results in insufficient deoxidization. Further, an excessively low amount of Al increases the index of cleanliness of the steel. Further, an excessively low amount of Al requires increased costs. Thus, the preferable lower limit of the Al content in the first layer of the weld metal is 0.003%.

N: 0.005 to 0.20%

Nitrogen (N) increases the high-temperature strength of steel. N further increases the activity of C in the weld metal, thereby improving the metal-dusting resistance of the weld metal. On the other hand, if an excessive amount of N is contained, the ductility of the weld metal decreases. In view of this, the N content in the first layer of the weld metal should be in the range from 0.005 to 0.20%. The preferable lower limit of the N content in the first layer of the weld metal is 0.010%. The preferable upper limit of the N content in the first layer of the weld metal is 0.15%.

O: Up to 0.02%

Oxygen (O) is an impurity. If an excessive amount of O is contained, the toughness and ductility of the weld metal decrease. In view of this, the O content in the first layer of the weld metal should be up to 0.02%. The preferable upper limit of the O content in the first layer of the weld metal is 0.01%.

Ti: 0 to 0.5%

Titanium (Ti) is an optional element. That is, Ti need not be contained in the first layer of the weld metal. Ti bonds with Ni and precipitates within grains in the form of fine particles of an intermetallic compound, and is effective in providing a certain creep strength at high temperatures. Thus, Ti may be contained as necessary. When Ti is to be contained, the preferable lower limit is 0.005%. However, if the Ti content is high, particularly above 0.5%, then, during use at high temperatures, particles of the intermetallic compound phase rapidly become more coarse, which excessively decreases creep strength and toughness and, during welding, decreases the cleanliness of the weld metal, deteriorating weldability. In view of this, the upper limit of the Ti content in the first layer of the weld metal should be 0.5%.

Mo: 0 to 8%

Molybdenum (Mo) is an optional element. That is, Mo need not be contained in the first layer of the weld metal. Mo dissolves in a matrix and contributes to increasing creep strength at high temperatures. Thus, Mo may be contained as necessary. If Mo is to be contained, the preferable lower limit is 0.05%. However, if the Mo content is high, particularly above 8%, then, the stability of the austenite decreases, which decreases creep strength. In view of this, the upper limit of the Mo content in the first layer of the weld metal should be 8%.

Nb: 0 to 3%

Niobium (Nb) is an optional element. That is, Nb need not be contained in the first layer of the weld metal. Nb dissolves in a matrix or precipitates in the form of a carbonitride, thereby contributing to improving creep strength at high temperatures. Thus, Nb may be contained as necessary. If Nb is to be contained, the preferable lower limit is 0.05%. However, if the Nb content is high, particularly above 3%, then, a large amount of carbonitride precipitates, which decreases the ductility of the steel. In view of this, the upper limit of the Nb content in the first layer of the weld metal should be 3%.

Co: 0 to 15%

Cobalt (Co) is an optional element. That is, Co need not be contained in the first layer of the weld metal. Co stabilizes the austenitic phase and increases creep strength. Thus, Co may be contained as necessary. If Co is to be contained in the first layer of the weld metal, the preferable lower limit is 0.01%. On the other hand, if an excessive amount of Co is to be contained, this requires increased costs. In view of this, the upper limit of the Co content in the first layer of the weld metal is 15.0%. The preferable upper limit of the Co content in the first layer of the weld metal is 14.5%.

The balance in the chemical composition of the first layer of the weld metal is Fe and impurities. However, as discussed above, the first layer of the weld metal has an Fe content ranging from 10 to 40%.

[Chemical Composition of Welding Material]

As discussed above, the welded joint according to the present embodiment is obtained by welding using a welding material having a chemical composition including Cr: 15.0 to 35.0% and Ni: 40.0 to 70.0%. The welding material, together with a part of the base material, forms the weld metal.

Cr: 15.0 to 35.0%

Chromium (Cr) forms a protective oxidized-scale layer of $Cr_2O_3$, for example, and blocks carburizing gases. Thus, Cr gives carburization resistance, metal-dusting resistance and caulking resistance to steel. On the other hand, Cr bonds with C to form carbides, thereby decreasing creep strength. This effect is particularly significant in a steel with high Si and Cu contents. The Cr content in the welding material should be in the range from 15.0% to 35.0%. The preferable lower limit of the Cr content in the welding material is 16.0%. The preferable upper limit of the Cr content in the welding material is 33.0%, and the more preferable upper limit is 30.0%, and the yet more preferable upper limit is 28.0%.

Ni: 40.0 to 70.0%

Nickel (Ni) stabilizes an austenitic phase. Ni also decreases the enter rate of C entering the steel. Ni further increases the high-temperature strength of the steel. To cause Ni in the welding material to exhibit these effects, Ni must be contained in 40% or more. On the other hand, when an excessive amount of Ni is contained in the steel, the steel is saturated in terms of Ni's effects. In view of this, the Ni content in the welding material should be in the range from 40.0 to 70.0%. The preferable lower limit of the Ni content in the welding material is 45.0%.

In addition to Cr and Ni, the welding material preferably has the chemical composition described below.

C: 0.01 to 0.15%

Carbon (C) increases the strength of the weld metal. On the other hand, if an excessive amount of C is contained, the solidification cracking sensitivity during welding increases. In view of this, the C content in the welding material should be in the range from 0.01 to 0.15%. The preferable lower limit of the C content in the welding material is 0.03%, and the more preferable lower limit is 0.05%. The preferable upper limit of the C content in the welding material is 0.12%, and the more preferable upper limit is 0.10%.

Si: Up to 4.0%

Silicon (Si) deteriorates hot workability and weldability. In view of this, the Si content in the welding material should be up to 4.0%. The preferable upper limit of the Si content in the welding material is 3.5%, and the more preferable upper limit is 2.0%, and the yet more preferable upper limit is 1.5%. If a high corrosion resistance is needed in the welded joint, the lower limit of the Si content in the welding material is preferably 0.5%.

Mn: 0.01 to 3.5%

Manganese (Mn) deoxidizes steel. Mn also stabilizes the austenitic phase. Mn further improves the workability and weldability of the steel. On the other hand, if an excessive amount of Mn is contained, hot workability during production of the welding material is impaired. In view of this, the Mn content in the welding material should be in the range from 0.05 to 3.5%. The preferable lower limit of the Mn content in the welding material is 0.05%, and the more preferable lower limit is 0.10%. The preferable upper limit of the Mn content in the welding material is 3.0%.

P: Up to 0.03%

Phosphorus (P) is an impurity entering steel from a raw material or the like during smelting. P deteriorates the hot workability and weldability of the steel. P further increases the solidification crack sensitivity during welding in the weld metal. In view of this, the P content in the welding material should be up to 0.03%. It is preferable to reduce the P content in the welding material to the lowest level possible. The preferable upper limit of the P content in the welding material is 0.025%.

S: Up to 0.015%

Sulfur (S) is an impurity entering steel from a raw material or the like during smelting. S deteriorates the hot workability and weldability of the steel. In view of this, the S content in the welding material should be up to 0.015%. It is preferable to reduce the S content in the welding material to the lowest level possible. The preferable upper limit of the S content in the welding material is 0.005%, and the more preferable upper limit is 0.002%.

Cu: 0.01 to 4.0%

Copper (Cu) prevents surface reaction between a carburizing gas and a metal, thereby improving the metal-dusting resistance of the metal. Cu also stabilizes the austenitic phase. On the other hand, if an excessive amount of Cu is contained, the solidification cracking sensitivity during welding increases. In view of this, the Cu content in the welding material should be in the range from 0.01 to 4.0%. The preferable lower limit of the Cu content in the welding material is 0.03%. The preferable upper limit of the Cu content in the welding material is 3.5%.

Al: 0 to 1.5%

Aluminum (Al) is an optional element. That is, Al need not be contained in the welding material. Al deoxidizes steel. On the other hand, if an excessive amount of Al is contained, a large amount of nitride is formed, which decreases the toughness of the steel. Further, if an excessive amount of Al is contained, welding operability deteriorates. In view of this, the Al content in the welding material should be up to 1.5%, and preferably up to 1.0%. However, an excessively low amount of Al results in insufficient deoxidization. Further, an excessively low amount of Al increases the index of cleanliness of the steel. Further, an excessively low amount of Al requires increased costs. Thus, the preferable lower limit of the Al content in the welding material is 0.003%. If a high strength at high-temperature is needed in the welded joint, it is preferable that the lower limit of the Al content in the welding material is 0.15%.

N: 0.005 to 0.1%

Nitrogen (N) increases the high-temperature strength of steel. N further increases the activity of C in the welding material, thereby improving the metal-dusting resistance of the welding material. On the other hand, if an excessive amount of N is contained, the hot workability during production of the welding material deteriorates. In view of this, the N content in the welding material should be in the range from 0.005 to 0.1%. The preferable lower limit of the N content in the welding material is 0.010%. The preferable upper limit of the N content in the welding material is 0.05%.

O: Up to 0.03%

Oxygen (O) is an impurity. If an excessive amount of O is contained, hot workability during production of the welding material deteriorates. Further, the toughness and ductility of the weld metal decrease. In view of this, the O content in the welding material should be up to 0.03%. The preferable upper limit of the O content in the welding material is 0.02%.

Ti: 0 to 1.0%

Titanium (Ti) is an optional element. That is, Ti need not be contained in the welding material. Ti bonds with Ni and precipitates within grains in the form of fine particles of an intermetallic compound, and is effective in providing a certain creep strength at high temperatures. Thus, Ti may be contained as necessary. When Ti is to be contained, the preferable lower limit is 0.15%. However, if the Ti content is high, particularly above 1.0%, then, during use at high temperatures, particles of the intermetallic compound phase rapidly become more coarse, which excessively decreases creep strength and toughness and, during production of an alloy, decreases cleanliness, deteriorating manufacturability. In view of this, the upper limit of the Ti content in the welding material should be 1.0%.

Mo: 0 to 15%

Molybdenum (Mo) is an optional element. That is, Mo need not be contained in the welding material. Mo dissolves in a matrix and contributes to increasing creep strength at high temperatures. Thus, Mo may be contained as necessary. If Mo is to be contained, the preferable lower limit is 0.01%, and the more preferable lower limit is 7%. However, if the Mo content is high, particularly above 15%, then, the stability of the austenite decreases, which decreases creep strength. In view of this, the upper limit of the Mo content in the welding material should be 15%.

Nb: 0 to 5%

Niobium (Nb) is an optional element. That is, Nb need not be contained in the welding material. Nb dissolves in a matrix or precipitates in the form of a carbonitride, thereby contributing to improving creep strength at high temperatures. Thus, Nb may be contained as necessary. If Nb is to be contained, the preferable lower limit is 0.005%. However, if the Nb content is high, particularly above 5%, then, a large amount of carbonitride precipitates, which decreases the ductility of the steel. In view of this, the upper limit of the Nb content in the welding material should be 5%.

Co: 0 to 15%

Cobalt (Co) is an optional element. That is, Co need not be contained in the welding material. Co stabilizes the austenitic phase and increases creep strength. Thus, Co may be contained as necessary. If Co is to be contained in the welding material, the preferable lower limit is 0.01%. On the other hand, if an excessive amount of Co is to be contained, this requires increased costs. In view of this, the upper limit of the Co content in the welding material is 15.0%. The preferable upper limit of the Co content in the welding material is 14.5%.

If, particularly, high-temperature strength is to be ensured, it is preferable that the chemical composition of the welding material includes Al: 0.15 to 1.5%; Ti: 0.15 to 1.0%; and Mo: 7 to 15%, and further includes at least one of Nb: 0.1 to 5% and Co: 0.1 to 15%.

Further, if, particularly, corrosion resistance is to be ensured, it is preferable that the chemical composition of the welding material includes Si: 0.5 to 4.0%.

[Manufacturing Method]

First, an example method of manufacturing the base material will be described. A steel having the chemical composition for the base material described above is smelted. The smelting may be performed by an electric furnace, an Ar—$O_2$ mixture bottom-blown decarburizing furnace (AOD furnace), or a vacuum decarburizing furnace (VOD furnace). The smelted steel is used to produce an ingot by the ingot-making method. Alternatively, the smelted steel may be used to produce a slab by continuous casting.

The ingot or slab is used to produce a base material. The base material may be a steel plate or steel pipe, for example. The steel plate may be produced by subjecting the ingot or slab to hot working such as hot forging or hot rolling, for example. The steel pipe may be produced by, for example, subjecting the ingot or slab to hot working to produce a round billet, and subjecting the round billet to hot working such as piercing-rolling, hot extrusion or hot forging. Alternatively, the steel pipe may be produced by bending a steel plate to form an open pipe and welding those edges of the open pipe that extend in the longitudinal direction.

Well-known heat treatment is performed on the base material, as necessary.

Next, an example method of manufacturing the welding material will be described. A steel having the chemical composition for the welding material described above is smelted. The smelted steel is cast into an ingot. The ingot is hot-worked to produce a welding material. The welding material may be in the shape of a rod or block.

Again, a well-known heat treatment is performed on the welding material, as necessary.

The welding material described above is used to weld the base material described above. This provides a welded joint. The welding method may be, for example, TIG welding, MIG welding, MAG welding, or submerge welding. During welding, a part of the base material and the welding material melt together and solidify to form a weld metal.

At this time, the dilution rate with respect to the base material is adjusted such that the Fe content in the first layer of the weld metal is in the range from 10 to 40%. More specifically, the heat input during welding of the first layer and the rate at which the welding material is fed are adjusted depending on the chemical composition of the base material and the chemical composition of the welding material. As the heat input during welding of the first layer increases, the dilution ratio with respect to the base material increases and the Fe content in the first layer of the weld metal increases. As the rate at which the welding material is fed increases, the dilution ratio with respect to the base material decreases and the Fe content in the first layer of the weld metal decreases.

EXAMPLES

The present invention will be described in more detail using Examples. The present invention is not limited to these Examples.

Steels labeled with characters A and B having the chemical compositions shown in Table 1 were melted in a laboratory to produce ingots. The ingots were subjected to hot forging, cold rolling, heat treatment and machining to produce steel pipes (base materials) with an outer diameter of 25.4 mm, a thickness of 3.3 mm and a length of 60 mm.

TABLE 1

| Base material | Chemical composition (in mass %, balance Fe and impurities) | | | | | | | | | | | | |
|---|---|---|---|---|---|---|---|---|---|---|---|---|---|
| | C | Si | Mn | P | S | Cr | Ni | Cu | Al | O | N | Mo | Other |
| A | 0.070 | 0.96 | 0.82 | 0.022 | 0.001 | 19.93 | 25.10 | 3.01 | 0.03 | 0.0026 | 0.095 | <1 | — |
| B | 0.051 | 0.68 | 1.15 | 0.018 | 0.001 | 21.10 | 26.30 | 0.72 | 0.11 | 0.0100 | 0.012 | <1 | V: 0.003, Ca: 0.007, REM: 0.04, Nb: 0.5 |

Steels labeled with characters T to Z having the chemical compositions shown in Table 2 were melted in a laboratory to produce ingots. The ingots were subjected to hot forging, hot rolling, heat treatment and machining to produce weld wires (welding materials) with an outer diameter of 1.2 mm.

TABLE 2

| Welding material | Chemical composition (in mass %, balance Fe and impurities) | | | | | | | | | |
|---|---|---|---|---|---|---|---|---|---|---|
| | C | Si | Mn | P | S | Cr | Ni | Cu | N | O | Other |
| T | 0.07 | 0.20 | 0.07 | 0.003 | 0.007 | 22.00 | 54.60 | 0.07 | 0.006 | 0.01 | Al: 0.98, Ti: 0.4, Mo: 9.1, Co: 12.5 |
| U | 0.01 | 0.02 | 0.01 | 0.003 | 0.001 | 22.07 | 65.79 | 0.01 | 0.007 | 0.01 | Al: 0.2, Ti: 0.28, Mo: 8.3, Nb: 3.2 |
| V | 0.03 | 0.12 | 3.05 | 0.006 | 0.004 | 16.20 | 69.80 | 0.03 | 0.006 | 0.02 | — |
| W | 0.07 | 0.20 | 0.07 | 0.003 | 0.007 | 20.10 | 60.10 | 0.07 | 0.009 | 0.01 | Al: 0.82, Co: 10.5 |
| X | 0.10 | 1.46 | 0.21 | 0.001 | 0.001 | 29.90 | 65.82 | 2.10 | 0.007 | <0.01 | Al: 0.036 |
| Y | 0.10 | 0.08 | 3.50 | 0.002 | 0.002 | 22.50 | 40.00 | 2.50 | 0.006 | <0.01 | — |
| Z* | 0.10 | 0.60 | 0.08 | 0.002 | 0.002 | 15.60 | 35.00* | 2.10 | 0.008 | 0.01 | — |

*indicates deviation from the ranges of the invention

Circumferential edge preparation was performed on the steel pipes described above and, thereafter, the base materials and welding materials were combined as shown in Table 3 and welded under the conditions as shown to produce welded joints.

TABLE 3

| Test numeral | Base material | Welding material | First-layer heat input (kJ/cm) | Weld material feeding rate (mm/min) | Weld metal No. | Chemical composition (in mass %) | | | | | | |
|---|---|---|---|---|---|---|---|---|---|---|---|---|
| | | | | | | C | Si | Mn | P | S | Cr | Ni |
| J1 | A | T | 7.5 | 490 | T1 | 0.07 | 0.58 | 0.45 | 0.013 | 0.0040 | 20.97 | 39.85 |
| J2 | | | | 640 | T2 | 0.07 | 0.51 | 0.38 | 0.011 | 0.0045 | 21.15 | 42.51 |
| J3 | | | | 770 | T3 | 0.07 | 0.47 | 0.33 | 0.010 | 0.0049 | 21.28 | 44.28 |
| J4 | | | 6 | | T4 | 0.07 | 0.41 | 0.28 | 0.008 | 0.0053 | 21.42 | 46.34 |
| J5 | B | | 7.5 | 490 | T5 | 0.06 | 0.44 | 0.61 | 0.011 | 0.0040 | 21.55 | 40.45 |

TABLE 3-continued

| | | | | | | | | | | | | |
|---|---|---|---|---|---|---|---|---|---|---|---|---|
| J6 | | | | | 640 | T6 | 0.08 | 0.40 | 0.51 | 0.009 | 0.0045 | 21.63 | 43.00 |
| J7 | | | | | 770 | T7 | 0.06 | 0.37 | 0.45 | 0.008 | 0.0049 | 21.69 | 44.70 |
| J8 | A | U | 7.5 | 490 | U1 | 0.04 | 0.49 | 0.42 | 0.013 | 0.0010 | 21.00 | 47.13 |
| J9 | | | | 640 | U2 | 0.03 | 0.41 | 0.34 | 0.011 | 0.0010 | 21.19 | 51.09 |
| J10 | | | | 770 | U3 | 0.03 | 0.35 | 0.29 | 0.010 | 0.0010 | 21.32 | 53.74 |
| J11 | | | 6 | | U4 | 0.03 | 0.28 | 0.24 | 0.008 | 0.0010 | 21.47 | 56.82 |
| J12 | | | 4 | | U5 | 0.02 | 0.21 | 0.17 | 0.007 | 0.0010 | 21.64 | 60.34 |
| J13 | B | | 7.5 | 490 | U6 | 0.03 | 0.35 | 0.58 | 0.011 | 0.0010 | 21.59 | 47.73 |
| J14 | | | | 640 | U7 | 0.03 | 0.29 | 0.48 | 0.009 | 0.0010 | 21.67 | 51.59 |
| J15 | | | | 770 | U8 | 0.02 | 0.25 | 0.41 | 0.008 | 0.0010 | 21.73 | 54.16 |
| J16 | A | V | 7.5 | 490 | V1 | 0.05 | 0.54 | 1.94 | 0.014 | 0.0025 | 18.07 | 47.45 |
| J17 | | | | 640 | V2 | 0.05 | 0.46 | 2.14 | 0.013 | 0.0028 | 17.73 | 51.47 |
| J18 | | | | 770 | V3 | 0.04 | 0.41 | 2.27 | 0.012 | 0.0030 | 17.51 | 54.16 |
| J19 | | | 6 | | V4 | 0.04 | 0.36 | 2.43 | 0.010 | 0.0032 | 17.24 | 57.28 |
| J20 | | | 4 | | V5 | 0.04 | 0.29 | 2.60 | 0.009 | 0.0034 | 16.95 | 60.86 |
| J21 | B | | 7.5 | 490 | V6 | 0.04 | 0.40 | 2.10 | 0.012 | 0.0025 | 18.65 | 48.05 |
| J22 | | | | 640 | V7 | 0.04 | 0.35 | 2.27 | 0.011 | 0.0028 | 18.21 | 51.97 |
| J23 | | | | 770 | V8 | 0.04 | 0.32 | 2.39 | 0.010 | 0.0030 | 17.92 | 54.58 |
| J24 | A | W | 7.5 | 770 | W1 | 0.07 | 0.43 | 0.30 | 0.009 | 0.0051 | 20.05 | 49.60 |
| J25 | | | 6 | | W2 | 0.07 | 0.39 | 0.26 | 0.008 | 0.0055 | 20.06 | 51.35 |
| J26 | | | 4 | | W3 | 0.07 | 0.35 | 0.22 | 0.007 | 0.0058 | 20.07 | 53.10 |
| J27 | B | | 7.5 | | W4 | 0.06 | 0.34 | 0.39 | 0.008 | 0.0052 | 20.40 | 49.96 |
| J28 | | | 6 | | W5 | 0.07 | 0.32 | 0.34 | 0.007 | 0.0055 | 20.35 | 51.85 |
| J29 | A | X | 7.5 | 490 | X1 | 0.09 | 1.38 | 1.68 | 0.011 | 0.0009 | 21.80 | 46.72 |
| J30 | | | | 640 | X2 | 0.09 | 1.48 | 1.90 | 0.009 | 0.0009 | 22.28 | 52.24 |
| J31 | | | | 770 | X3 | 0.09 | 1.51 | 1.95 | 0.008 | 0.0009 | 22.39 | 53.51 |
| J32 | | | 6 | 770 | X4 | 0.09 | 1.58 | 2.08 | 0.006 | 0.0010 | 22.68 | 56.90 |
| J33 | | | 4 | | X5 | 0.09 | 1.64 | 2.21 | 0.005 | 0.0010 | 22.98 | 60.29 |
| J34 | A | Y | 7.5 | | Y1 | 0.09 | 0.47 | 2.32 | 0.011 | 0.0015 | 21.37 | 33.44 |
| J35 | | | 6 | | Y2 | 0.09 | 0.40 | 2.54 | 0.009 | 0.0016 | 21.57 | 34.64 |
| J36 | B | | 7.5 | 490 | Y3 | 0.08 | 0.38 | 2.33 | 0.010 | 0.0015 | 21.80 | 33.15 |
| J37 | | | | 640 | Y4 | 0.08 | 0.36 | 2.42 | 0.009 | 0.0015 | 21.86 | 33.70 |
| J38 | | | | 770 | Y5 | 0.08 | 0.34 | 2.47 | 0.009 | 0.0016 | 21.88 | 33.97 |
| J39 | A | Z* | 7.5 | 770 | Z1 | 0.09 | 0.73 | 0.34 | 0.009 | 0.0016 | 17.12 | 31.54 |
| J40 | | | 6 | | Z2 | 0.09 | 0.70 | 0.29 | 0.008 | 0.0017 | 16.81 | 32.23 |
| J41 | | | 4 | | Z3 | 0.09 | 0.67 | 0.23 | 0.006 | 0.0018 | 16.47 | 33.02 |

| Test numeral | Chemical composition (in mass %) | | | | | | | | | MD resistance of weld metal |
|---|---|---|---|---|---|---|---|---|---|---|
| | Cu | Al | O | N | Co | Ti | Mo | Nb | Fe | |
| J1 | 1.54 | 0.505 | 0.008 | 0.053 | 6.25 | 0.20 | 4.55 | — | 25.0 | ○ |
| J2 | 1.28 | 0.591 | 0.008 | 0.045 | 7.38 | 0.24 | 5.37 | — | 26.1 | ○ |
| J3 | 1.10 | 0.648 | 0.007 | 0.040 | 8.13 | 0.26 | 5.92 | — | 23.7 | ○ |
| J4 | 0.89 | 0.714 | 0.007 | 0.034 | 9.00 | 0.29 | 6.55 | — | 20.6 | ○ |
| J5 | 0.40 | 0.545 | 0.008 | 0.011 | 6.25 | 0.20 | 4.55 | 0.25 | 24.6 | ○ |
| J6 | 0.34 | 0.623 | 0.008 | 0.011 | 7.38 | 0.24 | 5.37 | 0.21 | 25.8 | ○ |
| J7 | 0.30 | 0.676 | 0.007 | 0.011 | 8.13 | 0.26 | 5.92 | 0.18 | 23.4 | ○ |
| J8 | 1.51 | 0.115 | 0.009 | 0.053 | — | 0.14 | 4.12 | 1.69 | 27.6 | ○ |
| J9 | 1.24 | 0.130 | 0.008 | 0.045 | — | 0.17 | 4.86 | 1.99 | 23.5 | ○ |
| J10 | 1.06 | 0.141 | 0.008 | 0.040 | — | 0.18 | 5.36 | 2.19 | 20.8 | ○ |
| J11 | 0.85 | 0.152 | 0.008 | 0.034 | — | 0.20 | 5.93 | 2.43 | 17.7 | ○ |
| J12 | 0.61 | 0.166 | 0.008 | 0.027 | — | 0.22 | 6.59 | 2.70 | 14.1 | ○ |
| J13 | 0.37 | 0.155 | 0.009 | 0.011 | — | 0.14 | 4.12 | 1.94 | 27.2 | ○ |
| J14 | 0.30 | 0.163 | 0.008 | 0.011 | — | 0.17 | 4.86 | 2.19 | 23.3 | ○ |
| J15 | 0.26 | 0.169 | 0.008 | 0.011 | — | 0.18 | 5.36 | 2.37 | 20.6 | ○ |
| J16 | 1.52 | 0.015 | 0.015 | 0.051 | — | — | — | — | 30.4 | ○ |
| J17 | 1.25 | 0.012 | 0.016 | 0.042 | — | — | — | — | 26.8 | ○ |
| J18 | 1.07 | 0.011 | 0.017 | 0.037 | — | — | — | — | 24.5 | ○ |
| J19 | 0.86 | 0.008 | 0.017 | 0.031 | — | — | — | — | 21.7 | ○ |
| J20 | 0.63 | 0.006 | 0.018 | 0.024 | — | — | — | — | 18.6 | ○ |
| J21 | 0.38 | 0.055 | 0.015 | 0.009 | — | — | — | — | 30.0 | ○ |
| J22 | 0.31 | 0.045 | 0.016 | 0.009 | — | — | — | — | 26.6 | ○ |
| J23 | 0.27 | 0.039 | 0.017 | 0.009 | — | — | — | — | 24.2 | ○ |
| J24 | 0.95 | 0.583 | <0.01 | 0.035 | 7.35 | — | — | — | 20.6 | ○ |
| J25 | 0.81 | 0.623 | <0.01 | 0.031 | 7.88 | — | — | — | 18.5 | ○ |
| J26 | 0.66 | 0.662 | <0.01 | 0.026 | 8.40 | — | — | — | 16.4 | ○ |
| J27 | 0.27 | 0.607 | 0.01 | 0.010 | 7.35 | — | — | — | 20.4 | ○ |
| J28 | 0.23 | 0.643 | 0.01 | 0.010 | 7.88 | — | — | — | 18.4 | ○ |
| J29 | 3.57 | 0.033 | <0.01 | 0.050 | — | — | — | — | 24.7 | ○ |
| J30 | 3.71 | 0.034 | <0.01 | 0.039 | — | — | — | — | 18.2 | ○ |
| J31 | 3.74 | 0.034 | <0.01 | 0.036 | — | — | — | — | 16.7 | ○ |
| J32 | 3.83 | 0.035 | <0.01 | 0.029 | — | — | — | — | 12.8 | ○ |
| J33 | 3.91 | 0.035 | <0.01 | 0.022 | — | — | — | — | 8.8* | x |
| J34 | 2.72 | 0.013 | <0.01 | 0.045 | — | — | — | — | 39.5 | ○ |
| J35 | 2.68 | 0.011 | <0.01 | 0.038 | — | — | — | — | 38.0 | ○ |
| J36 | 1.61 | 0.055 | <0.01 | 0.009 | — | — | — | — | 40.3* | x |
| J37 | 1.68 | 0.051 | <0.01 | 0.009 | — | — | — | — | 39.6 | ○ |
| J38 | 1.72 | 0.048 | <0.01 | 0.009 | — | — | — | — | 39.2 | ○ |

TABLE 3-continued

| | | | | | | | | | | |
|---|---|---|---|---|---|---|---|---|---|---|
| J39 | 2.42 | 0.011 | <0.01 | 0.038 | — | — | — | — | 47.7* | x |
| J40 | 2.35 | 0.008 | <0.01 | 0.032 | — | — | — | — | 47.5* | x |
| J41 | 2.28 | 0.006 | <0.01 | 0.025 | — | — | — | — | 47.2* | x |

*indicates deviation from the ranges of the invention

As shown in Table 3, the dilution ratio with respect to the base material was varied by varying the heat input for welding the first layer (first-layer heat input) in the range from 4 to 8 kJ/cm and varying the rate at which the welding material was fed in the range from 490 to 770 mm/min. Thereafter, during building-up, welding was performed at a heat input in the range from 8 to 15 kJ/cm to produce welded joints.

First, in a joint to which only a first layer has been welded, the chemical composition of the first layer of weld metal was analyzed.

Next, the welding solidification crack resistance of each welded joint was evaluated. More specifically, liquid penetrant examination was conducted on the weld bead of each welded joint produced to detect any defects on the bead surface (i.e. welding solidification cracks). If no defects were detected, the welded joint was determined to satisfy the performance requirement of the present invention.

Further, the metal-dusting resistance of each welded joint was evaluated. More specifically, from each welded joint produced, a test specimen having weld metal at its center and having a plate thickness of 3.3 mm, a width of 20 mm and a length of 30 mm was cut out. This test specimen was held at a constant temperature of 650° C. for 500 hours in a gas environment with, in volume ratio, 45% CO, 42.5% $H_2$, 6.5% $CO_2$ and 6% $H_2O$. Thereafter, it was determined by visual inspection and optical microscopy whether there were pits on the surface of the test specimen. If there were no pits, the welded joint was determined to satisfy the performance requirement of the present invention.

The results are shown in Table 3. The column of "Chemical composition" in Table 3 lists the chemical composition of the first layer of the weld metal of each welded joint. The column of "MD resistance of weld metal" in Table 3 lists the evaluation results regarding metal-dusting resistance. "○" indicates that there were no pits according to such an evaluation. "x" indicates that there were pits according to such an evaluation. No welding solidification cracks were detected in any of the welded joints produced.

The welded joints with test numerals J1 to J32, J34, J35, J37 and J38 were in the ranges of the present invention. More specifically, in each of these welded joints, the chemical composition of the base material was in the ranges of the present invention, the welding material contained Cr: 15.0 to 30.0% and Ni: 40.0 to 70.0%, and the Fe content in the first layer of the weld metal was in the range from 10 to 40%. These welded joints exhibited both welding solidification crack resistance and good metal-dusting resistance.

In the welded joint with test numeral J33, metal dusting occurred according to the evaluation regarding metal-dusting resistance. In the welded joint with test number J33, the chemical composition of the base material was in the ranges of the present invention, and the welding material contained Cr: 15.0 to 30.0% and Ni: 40.0 to 70.0%. However, in the welded joint with test number J33, the Fe content in the first layer of the weld metal was low. This is presumably why the weld metal, which is the solidified microstructure, did not have sufficient carburization-preventing effect.

In the welded joint with test numeral J36, metal dusting occurred according to the evaluation regarding metal-dusting resistance. In the welded joint with test number J36, the chemical composition of the base material was in the ranges of the present invention, and the welding material contained Cr: 15.0 to 30.0% and Ni: 40.0 to 70.0%. However, in the welded joint with test number J36, the Fe content in the first layer of the weld metal was high. This is presumably why the weld metal, which is the solidified microstructure, did not had sufficient carburization-preventing effect.

In the welded joints with test numerals J39 to J41, metal dusting occurred according to the evaluations regarding metal-dusting resistance. In the welded joints with test numerals J39 to J41, the Ni content in the welding material was low. As a result, the proportion of the weld metal represented by the Fe content was large, and the Fe content in the first layer was high. This is presumably why the weld metal, which is the solidified microstructure, did not have sufficient carburization-preventing effect.

INDUSTRIAL APPLICABILITY

The present invention can be suitably used as a welded joint for a member used in a high-temperature corrosive environment. The present invention can be suitably used as a welded joint for a chamber, reaction tube, part or the like used in a heat-exchanging hydrocarbon-reforming equipment, waste-heat collection equipment or the like for petroleum/gas refining or in a petrochemical plant.

The invention claimed is:

1. A welded joint obtained by welding using a welding material having a chemical composition including, in mass %, Cr: 15.0 to 35.0%; and Ni: 40.0 to 70.0%, comprising:
   a base material having a chemical composition of, in mass %:
   C: 0.03 to 0.075%;
   Si: 0.6 to 2.0%;
   Mn: 0.05 to 2.5%;
   P: up to 0.04%;
   S: up to 0.015%;
   Cr: more than 16.0% and less than 23.0%;
   Ni: not less than 20.0% and less than 30.0%;
   Cu: 0.5 to 10.0%;
   Mo: less than 1%;
   Al: up to 0.15%;
   N: 0.005 to 0.20%;
   O: up to 0.02%;
   Ca: 0 to 0.1%;
   REM: 0 to 0.15%;
   V: not less than 0% and less than 0.5%; and
   Nb: 0 to 2%,
   a balance being Fe and impurities; and
   a first-layer weld metal having a chemical composition including, in mass %, an Fe content ranging from 10 to 40%.

2. The welded joint according to claim 1, wherein the base material has a chemical composition including, in mass %, one or two selected from the group consisting of:

Ca: 0.005 to 0.1%; and
REM: 0.005 to 0.15%.

3. The welded joint according to claim 1, wherein the base material has a chemical composition including, in mass %, one or two selected from the group consisting of:
V: not less than 0.002% and less than 0.5%; and
Nb: 0.005 to 0.15%.

4. The welded joint according to claim 1, wherein the first-layer weld metal has a chemical composition of, in mass %:
C: 0.01 to 0.15%;
Si: 0.01 to 4.0%;
Mn: 0.05 to 3.0%;
P: up to 0.03%;
S: up to 0.015%;
Cr: more than 16.0% and less than 32.0%;
Ni: not less than 20.0%;
Cu: 0.03 to 5.0%;
Al: up to 1.0%;
N: 0.005 to 0.2%;
O: up to 0.02%;
Ti: 0 to 0.5%;
Mo: 0 to 8%;
Nb: 0 to 3%;
Co: 0 to 15%; and
Fe: 10 to 40%,
a balance being impurities.

5. The welded joint according to claim 1, wherein the welding material has a chemical composition of, in mass %:
C: 0.01 to 0.15%;
Si: up to 4.0%;
Mn: 0.01 to 3.5%;
P: up to 0.03%;
S: up to 0.015%;
Cr: 15.0 to 35.0%;
Ni: 40.0 to 70.0%;
Cu: 0.01 to 4.0%;
Al: 0 to 1.5%;
N: 0.005 to 0.1%;
O: up to 0.03%;
Ti: 0 to 1.0%;
Mo: 0 to 15%;
Nb: 0 to 5%; and
Co: 0 to 15%,
a balance being Fe and impurities.

6. The welded joint according to claim 5, wherein the welding material has a chemical composition including, in mass %:
Al: 0.15 to 1.5%;
Ti: 0.15 to 1.0%; and
Mo: 7 to 15%,
the chemical composition of the welding material further including at least one of Nb: 0.1 to 5% and Co: 0.1 to 15%.

7. The welded joint according to claim 5, wherein the welding material has a chemical composition including, in mass %:
Si: 0.5 to 4.0%.

8. A welded joint comprising:
a base material having a chemical composition of, in mass %:
C: 0.03 to 0.075%;
Si: 0.6 to 2.0%;
Mn: 0.05 to 2.5%;
P: up to 0.04%;
S: up to 0.015%;
Cr: more than 16.0% and less than 23.0%;
Ni: not less than 20.0% and less than 30.0%;
Cu: 0.5 to 10.0%;
Mo: less than 1%;
Al: up to 0.15%;
N: 0.005 to 0.20%;
O: up to 0.02%;
Ca: 0 to 0.1%;
REM: 0 to 0.15%;
V: not less than 0% and less than 0.5%; and
Nb: 0 to 2%,
a balance being Fe and impurities; and
a first-layer weld metal having a chemical composition of, in mass %:
C: 0.01 to 0.15%;
Si: 0.01 to 4.0%;
Mn: 0.05 to 3.0%;
P: up to 0.03%;
S: up to 0.015%;
Cr: more than 16.0% and less than 32.0%;
Ni: not less than 20.0%;
Cu: 0.03 to 5.0%;
Al: up to 1.0%;
N: 0.005 to 0.2%;
O: up to 0.02%;
Ti: 0 to 0.5%;
Mo: 0 to 8%;
Nb: 0 to 3%;
Co: 0 to 15%; and
Fe: 10 to 40%,
a balance being impurities.

9. A method of manufacturing a welded joint, comprising the steps of:
preparing a base material having a chemical composition of, in mass %:
C: 0.03 to 0.075%;
Si: 0.6 to 2.0%;
Mn: 0.05 to 2.5%;
P: up to 0.04%;
S: up to 0.015%;
Cr: more than 16.0% and less than 23.0%;
Ni: not less than 20.0% and less than 30.0%;
Cu: 0.5 to 10.0%;
Mo: less than 1%;
Al: up to 0.15%;
N: 0.005 to 0.20%;
O: up to 0.02%;
Ca: 0 to 0.1%;
REM: 0 to 0.15%;
V: not less than 0% and less than 0.5%; and
Nb: 0 to 2%,
a balance being Fe and impurities; and
welding the base material using a welding material having a chemical composition including, in mass %, Cr: 15.0 to 35.0%; and Ni: 40.0 to 70.0%,
wherein the welded joint includes a first-layer weld metal having a chemical composition including, in mass %, an Fe content ranging from 10 to 40%.

10. The method of manufacturing the welded joint according to claim 9, wherein the first-layer weld metal has a chemical composition of, in mass %:
C: 0.01 to 0.15%;
Si: 0.01 to 4.0%;
Mn: 0.05 to 3.0%;
P: up to 0.03%;
S: up to 0.015%;
Cr: more than 16.0% and less than 32.0%;
Ni: not less than 20.0%;

Cu: 0.03 to 5.0%;
Al: up to 1.0%;
N: 0.005 to 0.2%;
O: up to 0.02%;
Ti: 0 to 0.5%;
Mo: 0 to 8%;
Nb: 0 to 3%;
Co: 0 to 15%; and
Fe: 10 to 40%,
a balance being impurities.

11. The method of manufacturing the welded joint according claim 9, wherein the welding material has a chemical composition of, in mass %:
C: 0.01 to 0.15%;
Si: up to 4.0%;
Mn: 0.01 to 3.5%;
P: up to 0.03%;
S: up to 0.015%;
Cr: 15.0 to 35.0%;
Ni: 40.0 to 70.0%;
Cu: 0.01 to 4.0%;
Al: 0 to 1.5%;
N: 0.005 to 0.1%;
O: up to 0.03%;
Ti: 0 to 1.0%;
Mo: 0 to 15%;
Nb: 0 to 5%; and
Co: 0 to 15%,
a balance being Fe and impurities.

* * * * *